United States Patent
May et al.

(10) Patent No.: US 9,533,343 B2
(45) Date of Patent: Jan. 3, 2017

(54) ALUMINUM PORTHOLE EXTRUDED TUBING WITH LOCATING FEATURE

(71) Applicant: FORD GLOBAL TECHNOLOGIES, LLC, Dearborn, MI (US)

(72) Inventors: Christopher John May, Novi, MI (US); S. George Luckey, Jr., Dearborn, MI (US); Andrey M. Ilinich, Dearborn, MI (US); Stephen Kernosky, Livonia, MI (US); Kiran Kumar Mallela, Ann Arbor, MI (US); Brett D. Irick, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 14/302,544

(22) Filed: Jun. 12, 2014

(65) Prior Publication Data
US 2015/0360281 A1  Dec. 17, 2015

(51) Int. Cl.
| | |
|---|---|
| F16L 9/00 | (2006.01) |
| F16L 9/22 | (2006.01) |
| B21D 53/88 | (2006.01) |
| B62D 29/00 | (2006.01) |
| B21C 37/08 | (2006.01) |
| F16L 9/02 | (2006.01) |
| B21C 23/08 | (2006.01) |
| B62D 25/02 | (2006.01) |
| B62D 25/06 | (2006.01) |
| B21D 26/033 | (2011.01) |

(52) U.S. Cl.
CPC .......... *B21D 53/88* (2013.01); *B21C 23/085* (2013.01); *B21C 37/08* (2013.01); *B62D 29/008* (2013.01); *F16L 9/02* (2013.01); *B21D 26/033* (2013.01); *B62D 25/02* (2013.01); *B62D 25/06* (2013.01); *Y10T 29/49623* (2015.01)

(58) Field of Classification Search
CPC .................................. B21D 53/88; F16L 9/02
USPC .......................... 138/156, 170, 171, 155, 157
See application file for complete search history.

(56) References Cited

U.S. PATENT DOCUMENTS

| | | | | |
|---|---|---|---|---|
| 2,077,454 | A * | 4/1937 | Almdale ................ | B21D 53/00 138/171 |
| 2,157,564 | A * | 5/1939 | Peuthert ................. | F16L 51/04 138/121 |
| 3,970,113 | A * | 7/1976 | Guttinger ............ | B29C 47/0847 138/157 |
| 4,248,179 | A * | 2/1981 | Bonner ..................... | F28F 1/40 122/235.14 |
| 4,838,063 | A * | 6/1989 | Nishiyama ................ | B21C 1/24 29/527.2 |
| 4,967,583 | A | 11/1990 | Watanabe et al. | |
| 5,388,329 | A * | 2/1995 | Randlett ............. | B21C 37/0803 29/890.049 |

(Continued)

*Primary Examiner* — Paul R Durand
*Assistant Examiner* — Vishal Pancholi
(74) *Attorney, Agent, or Firm* — Jason C. Rogers; Brooks Kushman P.C.

(57) ABSTRACT

An extruded aluminum alloy tube for hydroforming into an automotive body component includes a wall defining a closed perimeter. The wall includes weld seams disposed in the wall and running longitudinally along the tube. An extruded pip is disposed on the wall and runs longitudinally along the tube. The pip is parallel to the seams and is configured to identify a location of the seams for alignment of the tube during manufacturing.

7 Claims, 3 Drawing Sheets

(56) References Cited

U.S. PATENT DOCUMENTS

| | | | |
|---|---|---|---|
| 5,595,085 A | 1/1997 | Chen | |
| 5,730,189 A * | 3/1998 | Randlett | B21C 37/0803 |
| | | | 138/142 |
| 6,161,989 A * | 12/2000 | Kotani | B60P 3/002 |
| | | | 138/146 |
| 6,270,245 B1 * | 8/2001 | Bruyas | B23B 35/00 |
| | | | 366/84 |
| 8,104,318 B2 | 1/2012 | Hiramoto et al. | |
| 2002/0023346 A1 * | 2/2002 | Butler | B60K 13/04 |
| | | | 29/890.08 |
| 2002/0100517 A1 * | 8/2002 | Somerville | F16L 59/025 |
| | | | 138/148 |
| 2003/0163918 A1 * | 9/2003 | Yoshitoshi | B21C 37/0803 |
| | | | 29/890.08 |
| 2010/0086710 A1 * | 4/2010 | Engelmeyer | E06B 3/6604 |
| | | | 428/34.1 |
| 2011/0174046 A1 * | 7/2011 | Beissel | B21C 37/0807 |
| | | | 72/368 |

* cited by examiner

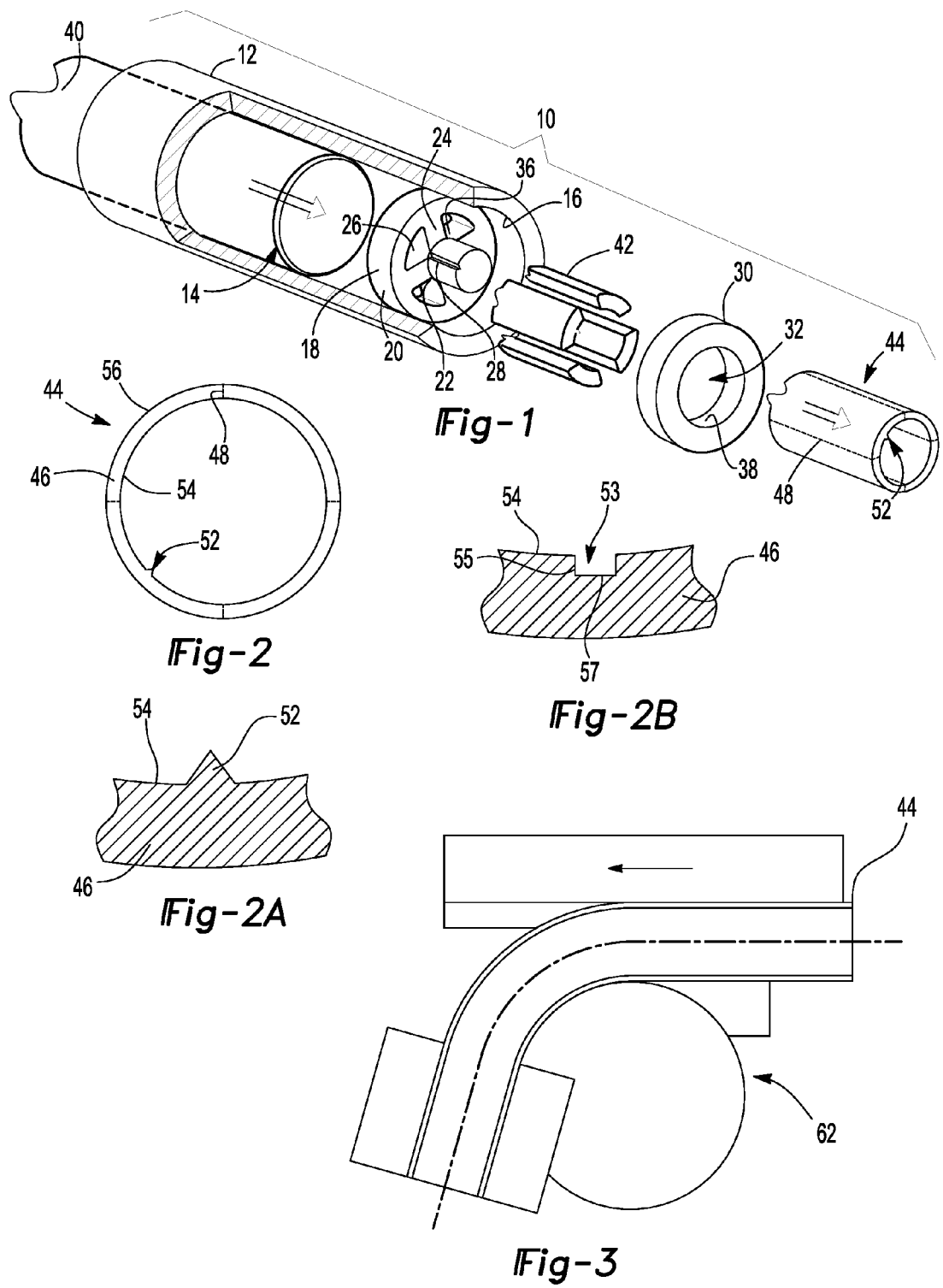

ALUMINUM PORTHOLE EXTRUDED TUBING WITH LOCATING FEATURE

TECHNICAL FIELD

The present disclosure relates to aluminum extruded tubing for automotive applications.

BACKGROUND

Vehicle manufacturers are implementing lighter, stronger materials, such as aluminum alloys to meet emission reduction goals, meet fuel economy goals, reduce manufacturing costs, and reduce vehicle weight. Increasingly demanding safety standards must be met while reducing vehicle weight. One approach to meeting these competing interests and objectives is to hydro-form high strength aluminum alloy tubular blanks into strong, lightweight hydro-formed parts.

Aluminum tube types include seam-welded tube, extruded seamless tube, and extruded structural tube. Seam-welded tube and extruded seamless tube are expensive. Extruded structural tubes are lower in cost because they are formed in a continuous mill operation having a greater line and material utilization efficiency than extruded seamless tubes and seam-welded tubes.

Extruded structural tubes are formed by extruding an aluminum billet through an extrusion die at a high temperature and at high pressure. Discontinuous material flow across the section of the shape occurs when the flowing aluminum separates in the mandrel plate and re-converges in the cap section. A weld line, or joining line, is created where the flowing aluminum re-converges to form the extruded shape. Extruded structural tubes may have two or more weld lines that are an artifact of the porthole extrusion process.

Hydro-forming complex parts may require a series of bending, pre-forming, hydro-forming, piercing and machining operations. Bending and hydro-forming aluminum tubes is not currently in use in high volume production operations. (i.e., more than 100,000 units/year) Aluminum intensive vehicles (AIVs) are envisioned that use metal forming methods consistent with current conventional automotive manufacturing methods.

The above challenges and other challenges are addressed by this disclosure as summarized below.

SUMMARY

According to one aspect of this disclosure, an extruded aluminum alloy tube for hydroforming into an automotive body component includes a wall defining a closed perimeter. The wall includes weld seams disposed in the wall and running longitudinally along the tube. An extruded pip is disposed on the wall and runs longitudinally along the tube and between the seams. The pip is parallel to the seams and is configured to identify a location of the seams for alignment of the tube during manufacturing.

According to another aspect of this disclosure, a method is disclosed for forming an aluminum alloy vehicle body component. An aluminum alloy billet is extruded into an aluminum tube that includes longitudinal weld seams formed in a sidewall of the tube during extrusion. A weld seam locating pip is also formed on a sidewall of the tube during extrusion. The pip is substantially parallel to the weld seams and is used to locate the weld seams during manufacturing of the body component. The pip may be disposed between the weld seams.

BRIEF DESCRIPTION OF THE DRAWINGS

FIG. 1 illustrates an exploded diagrammatical view of a porthole extrusion die made according to one embodiment of this disclosure.

FIG. 2 is a cross-section view of an extruded tube formed by the porthole extrusion die shown in FIG. 1.

FIG. 2A is a detail view of a pip feature on the tube.

FIG. 2B is a detail view of a pip feature on the tube according to an alternative design.

FIG. 3 is a diagrammatic representation of a rotary draw bending tool.

DETAILED DESCRIPTION

Figures 4, 5:
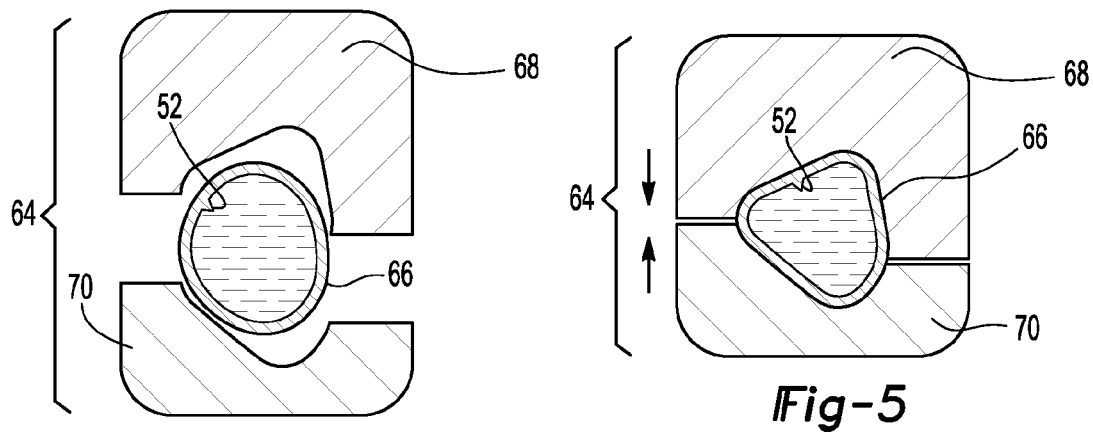
FIG. 4 is a cross-section view of a hydroforming die in the open position.
FIG. 5 is a cross-section view of the hydroforming die of FIG. 4 in the closed position.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a porthole extrusion die 10 is shown that includes a container 12. The container 12 includes a cavity 14 defining a cavity surface 16. A mandrel plate 18 is received within the cavity 14. The mandrel plate 18 includes an outer ring 20 and central element 22 that are connected to each other by a plurality of webs 24. The outer ring 20 is disposed against the cavity surface 16. The central element 22 includes an extended portion that projects axially in the downstream direction. The outer ring 20, the central element 22 and the webs 24 define a plurality of openings 26.

The extrusion die 10 also includes a cap 30. The cap 30, when installed is disposed inside the cavity 14 and adjacent to the mandrel plate 18 on the downstream side of the mandrel plate 18. The cap 30 defines an opening 32. The extended portion projects into the opening 32. The extended portion 34 includes an inside diameter (ID) forming surface 36. Forming surface 36 includes a marking element 28. The cap 30 includes an outside diameter (OD) forming surface 38. The ID forming surface 36 and the OD forming surface 38 cooperate to define an orifice though which the extruded tube exits the die 10.

The aluminum alloy billet 40 is extruded at high temperature and pressure through the extrusion die 10. In a first stage, the billet 40 is extruded through the mandrel plate 18. The mandrel plate 18 separates the billet 40 into a plurality of tube sections 42 as the billet passes through the openings 26.

In a second stage, the forming surfaces 36, 38 cause the tube sections 42 to re-converge at the cap 30 forming a structural tube 44. Re-convergence of the tube sections 42 creates weld seams 48 where the tube sections are joined to each other. (The weld seams are not welds in the traditional sense but rather are seams where pressure and heat forces two metal bodies together.) The marking element 28 creates a pip 52 in the aluminum as the aluminum passes over the forming surface 36. The pip 52 is formed near in time with the formation of the weld seams and is located at a fixed position relative to the weld seams. Forming the pip 52 and the weld seams 48 near in time ensures a constant spatial relationship between the weld seams 48 and the pip 52 despite any twisting of the tube 44 that may occur during extrusion. The pip 52 is a locating feature that allows a person or machine to determine weld seam location.

As illustrated, the marking element 28 is located on the ID forming surface 36 and the pip 52 is located on an interior surface of the tube. Alternatively, the marking element may be located on the OD forming surface 38 and the pip 52 may be located on an exterior surface of the tube.

Referring to FIG. 2, the aluminum alloy, porthole extruded, structural tube 44 is shown. The tube 44 may be a circular tube with a hollow circular center or may be another shape. The tube includes a sidewall 46 that has an interior surface 54 and an exterior surface 56. The weld seams 48 are formed in the sidewall 46. The weld seams 48 extend longitudinally along the length of the tube 44 and completely through the sidewall 46. The pip 52 is disposed on the interior surface 54. The pip 52 runs longitudinally along the length of the tube 44. The pip 52 may be located between the weld seams 48 or may be located on one of the weld seams. The pip 52 and the seams 48 are substantially parallel to each other in a fixed spatial relationship. The pip 52, as shown, is disposed on the interior surface 54 but the pip 52 may be disposed on the exterior surface 56. The location and size of the pip 52 is determined by the location and size of the marking element 28. The pip 52 as shown is enlarged for better visibility in the drawing.

The pip 52 may be a raised portion of the sidewall 46 as is shown in FIG. 2A. The raised pip 52 may be a ridge formed into the sidewall 46. The ridge is formed by a recessed marking element 28. For example, the marking element 28 may be a groove machined into the ID forming surface 36. During extrusion, aluminum is forced into the groove forming the ridge.

Alternatively, the pip 53 may be a recessed portion in the sidewall 46 as is shown in FIG. 2B. The recessed pip 53 may be a groove formed into the sidewall 46. The groove is formed by a raised marking element 28. For example, the raised marking element may be a tooth disposed on the ID forming surface 36. During extrusion, the tooth cuts a groove into the aluminum. The pip 53 defines a pair of opposing sidewalls 55 that extend from the interior surface 54 towards the exterior surface 56. A floor 57 of the pip 53 connects between the sidewalls 55.

The structural tubes 44 are formed into a finished part by hydroforming the tube into a desired shape. Prior to hydroforming the tubes may go through a series of processes such as pre-bending, pre-forming and cutting. The weld seams have slightly different material properties than the rest of the tube. Consistent placement of the weld seams is necessary to ensure a consistent finished part in mass production. Damage can occur if the weld seams are not placed in a proper location during processing. For example, the tube can crack, split or blowout if misaligned in the hydroforming die. Aside from the problem of potential physical part damage, it is very desirable to provide an extruded tube that has consistent properties. Having final parts with different weld seam locations can lead to inconsistent part performance. For example, the weld seam location can affect the strength of the part. To mitigate this issue, the weld seams must be placed in the appropriate position within the manufacturing dies. Unlike steel tubes, that have visible welds, the weld seams on extruded aluminum tubes are almost undetectable with the naked eye and are very difficult to locate.

The pip 52 is a locating feature that allows a person or machine to determine locations of the seam welds without being able to see the seams. The pip can be identified by a person with the naked eye and can be identified by an optical scanner or eddy current machine. The pip and weld seam are formed during extrusion and have a fixed spatial position relative to each other. By knowing the location of the pip, the location of the weld seams can be determined. The location, size, type and shape of the pip may vary. The pip 52 may also be used to measure the amount of twist that is occurring during the extrusion process. Different amounts of twist are desired for different extrusion operations. The pip provides an convenient visible indicator that can be monitored during the extrusion process to ensure that proper twist is occurring.

Referring to FIG. 3, a rotary draw bending tool 62 is shown. The tube 44 may go through a series of pre-bending stages to roughly shape the part prior to hydroforming so that the tube 44 will fit into the die. The tube 44 must be properly aligned in the bending tool 62. If the weld seams 48 are not properly aligned during the pre-bending phase, then they will not be properly aligned during hydroforming. The pip 52 is used to properly align the tube 44 in the bending tool 62. For example, the pip 52 is aligned with markings located on the bending tool 62 when the tube is loaded in the tool 62. Alternatively, a robot may be programed to place the pip 52 in a specific location relative to the tool 62. After proper alignment, the tube 44 is bent to form a pre-bent tube 66. The pre-bent tube 66 may be pre-formed before hydroforming. The pre-forming may take place after the tube 44 is pre-bent.

Referring to FIGS. 4 and 5, a hydro-forming die 64 is shown. The die 64 includes a first die half 68 and a second die half 70. The pre-bent tube 66 is loaded into the hydroforming die 64 between the first and second die halves 68, 70. End plugs (not shown) are inserted into the open ends of the tube 44. A pressurizing medium (such as water) is pumped into the tube 66 to pressurize the interior of the tube. The die halves are clamped together to form a hydro-formed part 72. The tube 66 may be hydro-pierced in the hydroforming die 64. In another embodiment, the pre-bent tube 66 is pre-formed prior to hydroforming.

Figure 6:
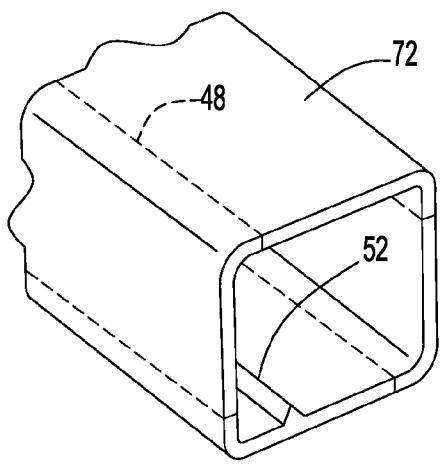
FIG. 6 is a fragmented perspective view of a hydro-formed vehicle body component.

Referring to FIG. 6, the hydro-formed part 72 is shown to have weld seams 48 at specific locations. For example, the seams are located away from holes and curved portions of the part 72. The pip 52 may be utilized throughout the pre-bending and hydroforming stages to ensure that the weld seams are in the design locations. Alternatively, the pip 52 may only be used at selected stages. For example, the pip may only be used at the pre-bending stage and thereafter the bends on the tube may be used to locate the weld seams. Proper alignment of the weld seams provides repeatable final parts with uniform strength, characteristics and performance. Variations in weld seam location may cause undesirable variations in the manufacturability, dimensional, or functional performance of the final product.

Figure 7:
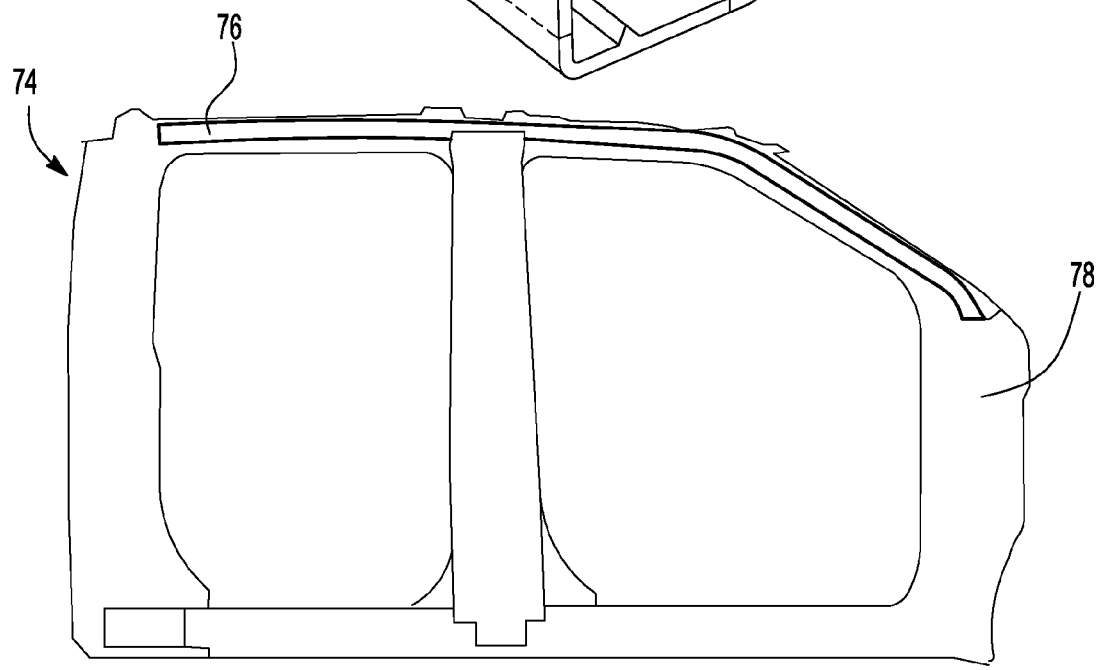
FIG. 7 is a fragmented elevation view of a truck cab with the body panels removed.

Referring to FIG. 7, a side view of a truck cab 74 is shown with the body panels removed. The cab 74 includes a hydro-formed roof rail 76. The roof rail 76 is a porthole extruded structural tube that may be manufactured using the previously described die and manufacturing process. The roof rail 76 attaches to the cab 74 at the hinge pillar 78 and at additional locations. The roof rail 76 provides rigidity to the cab and supports the body panels. The roof rail 76 must be strong to provide acceptable performance as tested in roof-crush, side impact, and other tests. Proper alignment of the weld seams in an extruded tube assures uniform strength and reduced variation in part performance.

Figure 8:
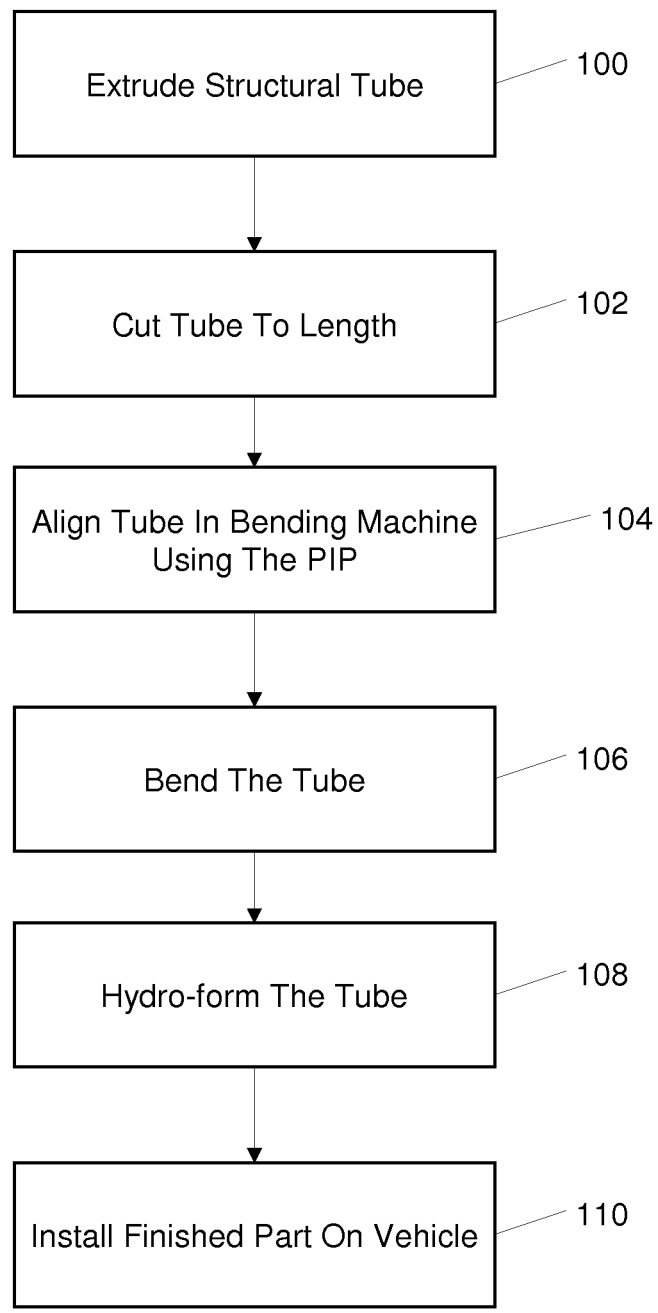
FIG. 8 is a flowchart illustrating one example of a method of forming a hydro-formed body component that includes a pip locating feature.

FIG. 8 is a flowchart illustrating a method of forming an aluminum body part for a vehicle. References to the components parts in the following description of the method are illustrated in FIGS. 1 to 7. At step 100 an aluminum alloy structural tube 44 is formed with a porthole extrusion die 10. The extrusion die 10 forms weld seams 48 in a sidewall 46 of the tube 44. The extrusion die 10 also forms a pip 52 in the sidewall 46 of the tube 44 near in time with the formation of the weld seams 48. For example the pip 52 and the weld seams 48 are formed essentially simultaneously. The tube 44 is extruded in a continuous operation. The tube 44 may be stretched after extrusion. At step 102, the extruded structural tube 44 is cut into desired lengths. At step 104 the tubes 44 are aligned in a bending tool 62 using the pip 52 to place the weld seams 48 at a desired location relative to the bending tool 62. The tube 44 is pre-bent with the tool at step 106. The pre-bent tube 66 is placed into a hydroforming die 64 and hydro-formed into a finished part 72 at step 108. Alternatively, the pre-bent tube is pre-formed prior to hydroforming. The finished part 72 is then installed onto a vehicle, such as a truck, at step 110.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An extruded aluminum alloy tube for hydroforming into an automotive body component, comprising:
    an extruded aluminum alloy tube including a wall defining a closed perimeter, the wall being formed of segments that are joined together during extrusion to form weld seams on the wall that extend longitudinally along an entire length of the tube, wherein the wall includes inner and outer surfaces that are concentric with each other; and
    an extruded locating pip defined by the wall, the locating pip being recessed into the wall and including opposing sidewalls each extending from the inner surface towards the outer surface, wherein the locating pip is circumferentially spaced from each of the seams and extends longitudinally along the entire length of the tube, and wherein circumferential distances between the locating pip and each of the weld seams is constant along an entire length of the tube to identify a location of the seams for alignment during manufacturing.

2. The extruded aluminum alloy tube of claim 1 wherein the locating pip includes a floor connecting between the sidewalls.

3. The extruded aluminum alloy tube of claim 1 wherein the locating pip and the weld seams are formed simultaneously during extrusion.

4. An extruded aluminum alloy tube comprising:
    an extruded tube including a circular wall having weld seams formed during extrusion that extend along a length of the tube; and
    a pip disposed on the wall at a location circumferentially spaced from each of the weld seams and extending along the length of the tube, wherein circumferential distances between the pip and each of the weld seams is constant along an entire length of the tube.

5. The extruded aluminum alloy tube of claim 4 wherein the wall further includes concentric interior and exterior surfaces, and wherein the pip is recessed into the interior surface and includes opposing sidewalls that extend from the interior surface towards the exterior surface.

6. The extruded aluminum alloy tube of claim 4 wherein the pip is disposed on the inner surface and projects radially inward therefrom.

7. The extruded aluminum alloy tube of claim 4 wherein the pip and the tube are integrally formed.

\* \* \* \* \*